(12) United States Patent
Keshner et al.

(10) Patent No.: US 11,305,230 B1
(45) Date of Patent: Apr. 19, 2022

(54) DIRECT CAPTURE OF CARBON DIOXIDE FROM AIR

(71) Applicants: Marvin S Keshner, Sonora, CA (US); Erik Garth Vaaler, Redwood City, CA (US)

(72) Inventors: Marvin S Keshner, Sonora, CA (US); Erik Garth Vaaler, Redwood City, CA (US)

( * ) Notice: Subject to any disclaimer, the term of this patent is extended or adjusted under 35 U.S.C. 154(b) by 0 days.

(21) Appl. No.: 17/525,897

(22) Filed: Nov. 13, 2021

(51) Int. Cl.
*B01D 53/62* (2006.01)
*B01D 53/83* (2006.01)
*B01D 53/96* (2006.01)
*C01B 32/50* (2017.01)

(52) U.S. Cl.
CPC ............. *B01D 53/62* (2013.01); *B01D 53/83* (2013.01); *B01D 53/96* (2013.01); *C01B 32/50* (2017.08); *B01D 2251/404* (2013.01); *B01D 2251/604* (2013.01); *B01D 2257/504* (2013.01); *B01D 2258/06* (2013.01)

(58) Field of Classification Search
CPC ........ B01D 53/62; B01D 53/83; B01D 53/96; B01D 2251/404; B01D 2257/504; B01D 2258/06; C01B 32/50
USPC ........................................................ 423/438
See application file for complete search history.

(56) References Cited

U.S. PATENT DOCUMENTS

| | | | |
|---|---|---|---|
| 3,392,649 A | 7/1968 | Rühle | |
| 8,916,118 B2 | 12/2014 | Escudero | |
| 9,382,165 B1 | 7/2016 | Vanderhye | |
| 9,776,131 B2 | 10/2017 | Eisenberger | |
| 9,878,286 B2 | 1/2018 | Eisenberger | |
| 10,279,307 B2 | 5/2019 | Rayner | |
| 10,413,866 B2 | 9/2019 | Eisenberger | |
| 10,569,956 B1 | 2/2020 | Keshner | |
| 2002/0018742 A1* | 2/2002 | Hoke | B01D 53/02 423/247 |
| 2010/0064890 A1* | 3/2010 | Keith | B01D 53/1475 95/212 |
| 2019/0321777 A1* | 10/2019 | Gerlach | B01D 53/62 |

* cited by examiner

*Primary Examiner* — Anita Nassiri-Motlagh
(74) *Attorney, Agent, or Firm* — Shalini Venkatesh

(57) ABSTRACT

A system for large scale capture of atmospheric carbon dioxide while exposed to air and weather in an outdoor environment, includes a large flat slab with a perimeter wall projecting above its surface; one or more rotary fans, providing uniform, high volume, low velocity, turbulent air flow over the entire slab surface; a transport system transferring powder—a particulate material mixed with air—to and from all locations on the slab or on an overlying mesh screen, a kiln, closed to outside air, and a compressor. The transport system includes either a vacuum/deposition system or a conveyor system with one or more conveyors. The kiln heats the particulate material, delivered by the transport system from the slab, to output released carbon dioxide, previously absorbed by the particulate material in the powder, to the compressor for compression, and either the heated particulate material, or a processed version of it.

20 Claims, 9 Drawing Sheets

DIRECT CAPTURE OF CARBON DIOXIDE FROM AIR

FIELD OF INVENTION

This invention relates in general to methods of reducing global warming, and more specifically to doing so by capturing and sequestering carbon dioxide directly from the air to reduce the concentration of gaseous carbon dioxide in the earth's atmosphere.

BACKGROUND

In 2021, the concentration of carbon dioxide in our atmosphere exceeds 400 ppm, well above its natural, pre-industrial level of 320 ppm. This high level of carbon dioxide is considered to be one of the prime contributors to global warming, which is creating rising sea levels, and more destructive storms, droughts, and floods.

The burning of fossil fuels, the de-forestation of huge land areas, the production of cement, and the production of steel, when combined, are putting an additional 40 billion tons of carbon dioxide into our atmosphere each year. To return to pre-industrial levels and stop global warming, we must reduce the amount of carbon dioxide we put into the air each year. We must also find a practical and inexpensive method to pull carbon dioxide directly out of the air, at a similar scale, 40 billion tons of carbon dioxide each year.

Many methods have been proposed to capture carbon dioxide from the smokestacks of electricity generating facilities that burn carbon-based fuels (such as: coal, oil, biomass, or natural gas), and from the kilns used to process limestone from producing Portland cement. These methods take advantage of the relatively high concentration of carbon dioxide in the smokestacks (10% or higher).

Removing 40 billion tons of carbon dioxide from the atmosphere is a huge challenge in scale. Even if this is done at 200,000 sites operating independently, each site would need to collect 4000 tons of carbon dioxide every week. If the material that collects the carbon dioxide is a solid, we would have to transport something like 8000 tons of material back and forth from the collection site to the processing site. This would be roughly a 10-ton truck, traveling back and forth every 6 minutes, to and from each site. The transportation cost and fuel requirement alone would make the total cost unreasonable.

Methods have been proposed to capture carbon dioxide directly from air. While they may look attractive for laboratory experiments or to concentrate carbon dioxide for a greenhouse or for synthetic fuel creation, they will not scale to the level required to capture 40 billion tons of carbon dioxide a year.

The very low concentration of carbon dioxide in air (400 ppm in volume, 600 ppm by weight) requires processing a huge volume of air, as every cubic meter of air only contains 0.8 grams of carbon dioxide. Prior art includes arrays of fans blowing air through zeolite membranes or into tanks of water with dissolved amines that capture the carbon dioxide. Capturing the annual addition of 40 billion tons of carbon dioxide requires processing 50 quadrillion ($10^{15}$) cubic meters of air per year or 1.6 billion cubic meters per second. An array of fans, operating with a typical air velocity of 5 m/sec (11 mph) would be huge. It would cover an area of 320 sq km.

The cost of the equipment and the amount of energy required to run it has made these prior art methods impractical for capturing large amounts of carbon dioxide directly from the air at a reasonable cost. A fundamentally new and different approach is required. Materials used must be literally "dirt" cheap, like the cost of sand. The need for new buildings and structures must be eliminated or their costs must be very low. Transportation costs must be avoided as much as possible. Air flow must be created at the lowest possible cost over huge areas.

Amines and zeolites are not cheap enough for this task, and there are no projections that suggest that they ever will be. They are still too expensive even for capturing the carbon dioxide found at much higher concentrations in smokestacks. Also, while amines and zeolites are relatively stable in indoor environments, their performance degrades rapidly in outdoor environments, especially when exposed to oxygen, sunlight, temperature cycling, freezing, and other weather. However, moving a huge volume of air into a sheltered environment and processing it "indoors" is more difficult and expensive.

There is, therefore, a need for methods and apparatus to inexpensively remove carbon dioxide directly from the air at a huge scale (circa 40 billion tons per year) and at a modest cost (circa $10 per ton of carbon dioxide).

SUMMARY

Embodiments generally relate to methods, systems, and apparatuses for capturing carbon dioxide directly from the air on a huge scale at very low cost. A key feature of this invention is providing the necessary huge amount of air flow, transporting and processing the huge amount of material that captures the carbon dioxide, stirring the carbon dioxide capture material to keep its surface active, and recycling the carbon dioxide capture material. All of this must be done at a huge scale for a very low cost. Otherwise, the cost of carbon dioxide capture directly from the air would be prohibitive. Most laboratory apparatus or laboratory methods proposed to date cannot scale up to the size necessary to collect billions of tons of carbon dioxide directly from the air at a low cost.

In one embodiment, huge volumes of air are blown at low velocities directly onto a huge, flat surface that is located outdoors, on the ground. In one embodiment, the surface is concrete. In one embodiment the flat surface is covered with a membrane material that is not easily abraded and holds water. In one embodiment, the concrete surface is covered with a thick layer of a powder comprising a mixture of air and particles of a chemical material that will react with and absorb carbon dioxide. The huge surface area of the concrete and the use of a large diameter fan make it possible to blow a high volume of air with a low air velocity. The power required for the fan scales as the area times the air velocity cubed. For a given volume of air flow (m3/sec) (equal to the fan area times the air velocity), a large diameter fan, operating with a low air velocity, blowing air over a large surface area, enables the fan to be lower in power and inexpensive to operate.

Unlike many commercial fans that are designed to minimize turbulence, in this invention, the fan blades are designed to produce a turbulent air flow. A turbulent air flow is necessary to minimize the thickness of the slow-moving boundary layer of air at the top surface of the powder containing the carbon dioxide-absorbing chemical material.

The potential high cost of transporting the powder to the flat surface, typically, though not always concrete, where it can be deposited under the fan and then re-collected is solved by making the size of the particles in the powder small, by mixing particles with plenty of air, by pumping the powder, the mixture of air and particles, through flexible pipes onto the concrete, and by vacuuming the powder through flexible pipes off the concrete. Instead of 10-ton trucks, travelling back and forth every 6 minutes, a typical embodiment of this invention would require only a 10-horsepower air pump and a 10-horsepower vacuum pump to move the same amount of the chemical material. Together with an array of flexible pipes, and light-weight vacuum/deposition heads, the powder is easily and inexpensively moved onto and off of the concrete slab, underneath the fan, so that it can absorb carbon dioxide and then be recycled. The total power for the large diameter fan and the pumps to move the powder back and forth is only a few pennies per ton of carbon dioxide captured.

In another embodiment, the high cost of transporting the powder to the flat surface is solved by moving the powder on conveyors and then distributing the powder over the slab with moving beams that distribute and stir the powder. Again, the power required is small.

On the concrete, air cannot diffuse very far into the powder fast enough to support the required high rate of carbon dioxide absorption. Therefore, the powder is stirred frequently so that unreacted material is available at the very top surface of the powder, close to the overlying air, where it can react quickly with the very dilute concentrations (400 ppm) of carbon dioxide present in the air. Without stirring, it could take one or more years, instead of a week to collect the amount of carbon dioxide necessary for viability. All of these activities—depositing and vacuuming, or conveying and distributing, and stirring the absorbing powder—are done by simple, inexpensive, lightweight moving mechanisms and pumps that require a relatively small amount of energy and operate automatically, under computer control.

In one embodiment, the absorbing material in the powder is chosen such that its reaction with carbon dioxide can be reversed, allowing the powder to be recycled easily with a relatively small amount of energy, and such that it is otherwise unaffected in an outdoor environment by sunlight, oxygen, rain, freezing, or typical concentrations of various atmospheric pollutants, like NO, $NO_2$ and $SO_2$. In addition, the absorbing material is chosen to be very inexpensive. In an outdoor environment, some of the powder will blow away and must be replaced at low cost. Commonly preferred, prior art, materials like amines and zeolites do not meet these criteria. They do not work well in outdoor environments, require too much energy to reverse their reaction with carbon dioxide, and are too expensive.

In some embodiments, after reacting with carbon dioxide in the air for a period of time (such as 1 week), the powder containing material that has reacted to absorb carbon dioxide is vacuumed off the concrete through flexible pipes, or conveyed off the concrete through conveyors, and placed into a closed kiln, where the powder is heated, the carbon dioxide captured from the air is released from the reacted material, and the material is restored to its original chemical composition, able to absorb more carbon dioxide. The powder containing the restored material is then placed back out onto the concrete slab, where it can collect more carbon dioxide from the air.

To absorb a substantial amount of carbon dioxide from the atmosphere, one must handle a huge amount of absorbing material and a huge amount of air. This must be done inexpensively. In the prior art, the absorbing material is a water solution that can be pumped or a sequence of membranes through which gas can flow. Novel to this invention, the absorbing material comprises small particles, that can be mixed with air to form a powder, which can be pumped and vacuumed through pipes and nozzles, or conveyed and distributed using conveyors, so that it can be transported easily and inexpensively.

In the prior art, air is moved to equipment that is enclosed and out of the sunlight and weather. This requires more energy, and the buildings and equipment to accomplish this add additional cost. In this invention, the carbon dioxide collection process is entirely outdoors, on the ground, on a simple, typically concrete slab, where it requires no building or other support structure, and where it is easy and inexpensive to create a huge volume of air flow, with a low air velocity, with large, low-power, low-cost fans. In some embodiments, only one fan is used to blow air over the entire area of the slab; in other embodiments, several fans may be used, each one blowing air over a corresponding, large section of the slab area. Whether one or several fans are used, the air velocity is low to minimize the amount of power required to provide the required air flow.

Finally, in one embodiment, the carbon dioxide, that is collected by the particulate material in the powder and released during heating, is compressed so that it can be efficiently transported to a location where it can be stored in a variety of ways. It can be stored in containers, pumped into a deep well for underground storage or pumped with added water into deep wells where the rock has been fracked or fractured, as described in U.S. Pat. No. 10,569,956.

DETAILED DESCRIPTION

Embodiments of the present invention provide low cost, energy efficient methods and apparatus for collecting carbon dioxide directly from the air, then compressing the collected carbon dioxide for easy and low-cost transportation to a location where it can be stored in a variety of ways. It can be stored in containers, pumped into caverns, into depleted gas or oil wells, or, with added water, into deep wells with fracked or cracked rock as described in U.S. Pat. No. 10,569,956.

In one embodiment, carbon dioxide collection units are designed to collect 4000 tons of carbon dioxide each week. Collecting 40 billion tons of carbon dioxide per year (the amount we are currently putting into the air) will require 200,000 carbon dioxide collection units. A representative method for operating one such collection unit may be understood with reference to FIG. 1.

Figure 1:
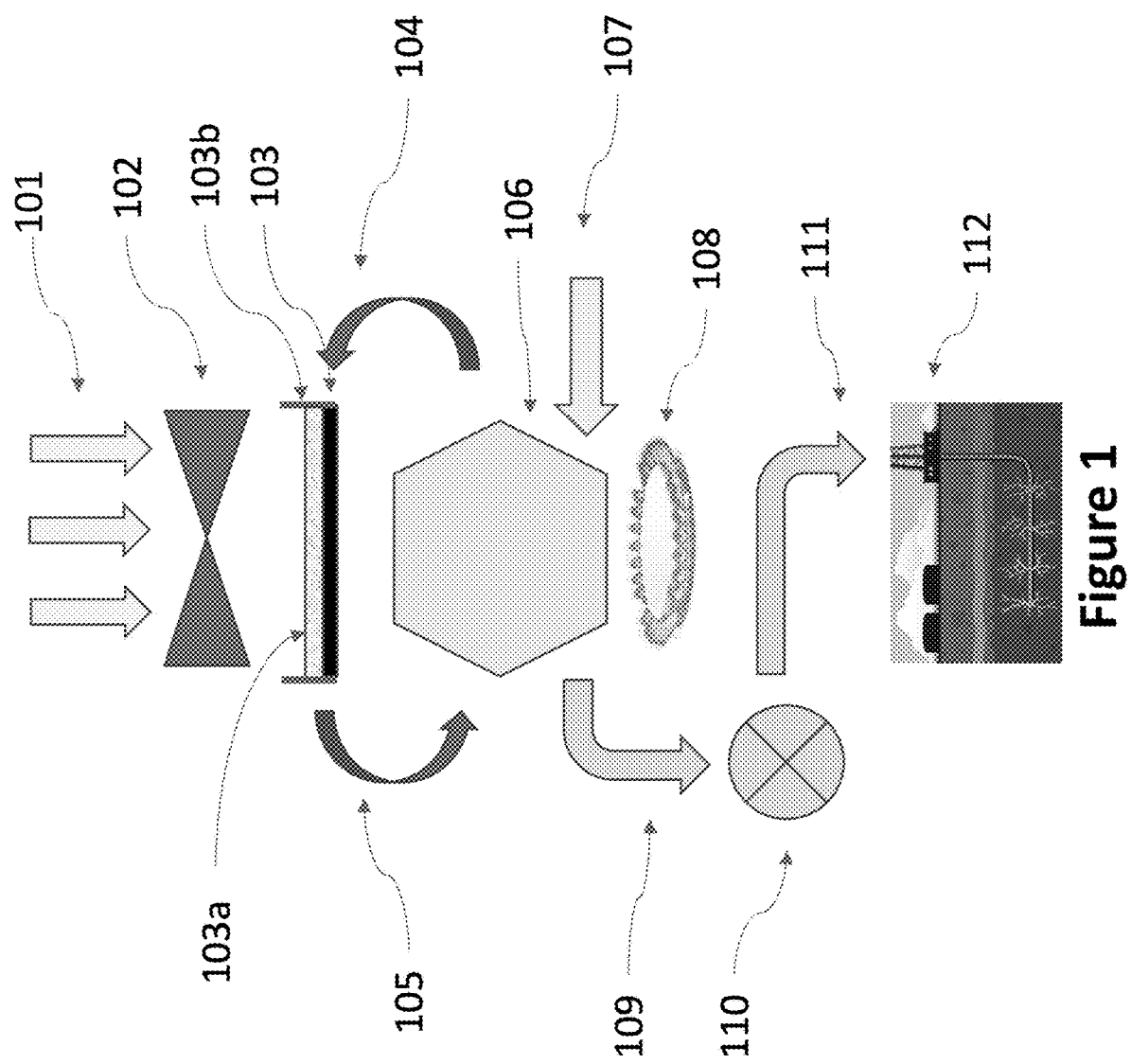
FIG. 1 is an illustration of a method by which carbon dioxide is directly captured from the air with a powder that is recycled, and then the carbon dioxide is compressed and transported for permanent storage in a deep well or a well with fracked or fractured rock, according to one embodiment.

In the embodiment illustrated in FIG. 1, air (210) is blown by a fan (102) onto a concrete slab (103) that is covered with a layer of powder (103a), comprising a mixture of air and a particles of a material with a chemical composition that can absorb carbon dioxide from the air. At the edges of the slab are concrete walls (103b) to retain the absorbing powder on the concrete slab. After exposure to air, the powder, which will comprise some particles that have reacted with carbon dioxide, and some that have not, is vacuumed off the concrete slab and pumped (105) to where it can be conveyed into a kiln (106) that is closed to the atmosphere. The kiln is heated (108) and the absorbed carbon dioxide is released (109), captured, compressed (110), and transported (111) to a location where it can be stored. Shown in FIG. 1 is one possible storage method, in which the carbon dioxide plus some water is pumped into a depleted fracked well (112) as described in U.S. Pat. No. 10,569,956. After the carbon dioxide is released from the powder, depending on the choice of the particulate material, steam (107) may be added to return the particulate material to its original chemical composition. The restored powder (a mixture of air and restored particulate material) is pumped back (104) onto the concrete slab to collect more carbon dioxide.

Figure 2A:
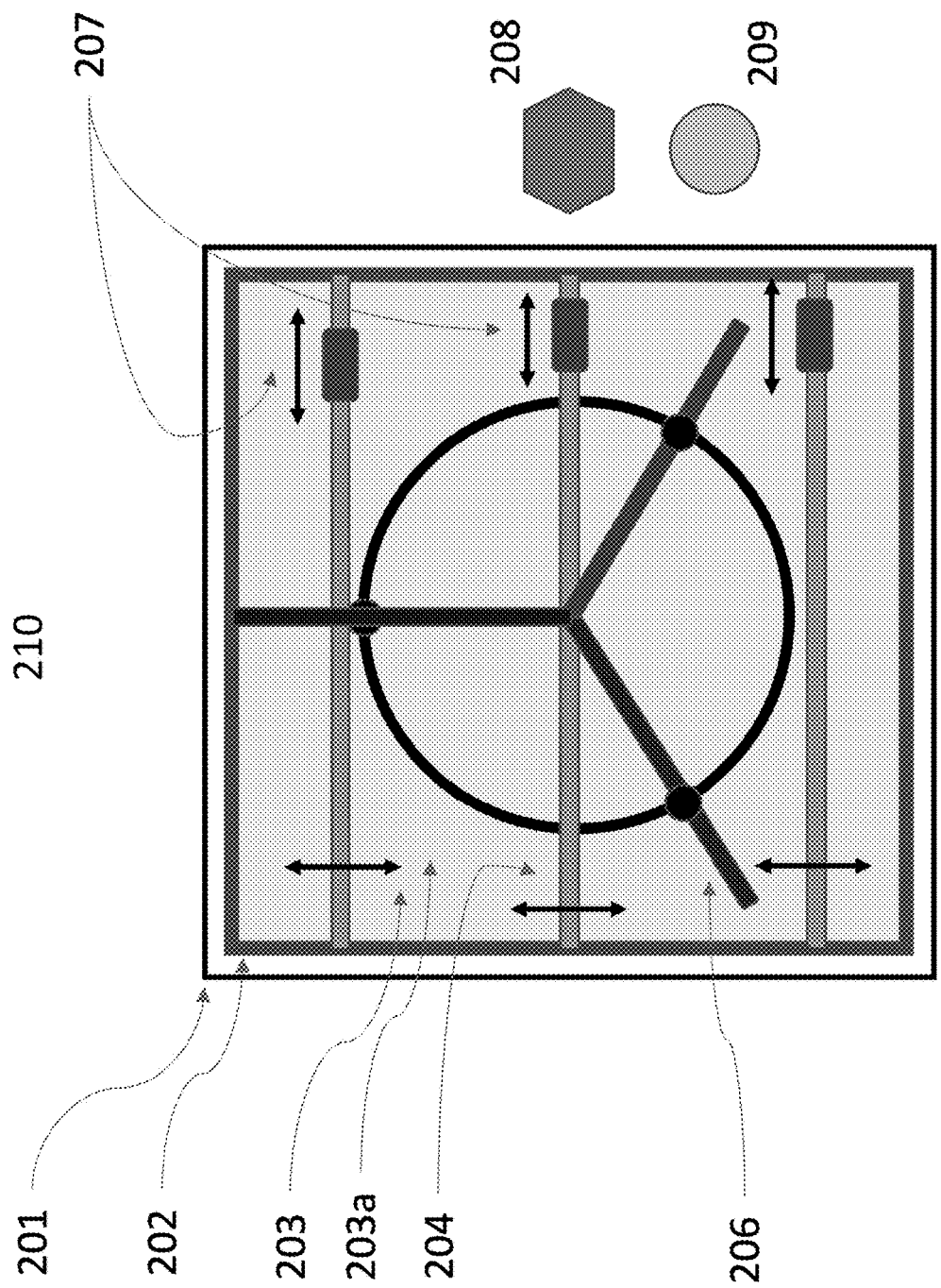
FIG. 2A is an illustration and top-down view of an outdoor apparatus for capturing carbon dioxide directly from the air, according to one embodiment.

As illustrated in FIG. 2A, in one embodiment, each carbon dioxide collection unit consists of a single rotary fan (206) above a concrete slab (203), on the ground, outdoors, upon which is placed a layer of a powder comprising air and a particulate material able to absorb carbon dioxide (203a) from the air. The thickness of this layer is selected to be sufficient for absorbing the desired amount of carbon dioxide. In one embodiment, the thickness is selected to absorb 4000 tons of carbon dioxide, plus about 20% additional thickness to provide extra operating margin. In one embodiment, the concrete slab is protected with a high roof, at least 5 m above the concrete slab. A high roof will partially protect the concrete slab and the powder from direct sunlight, and direct rain and snow, while allowing ample flow of fresh air into the fan. Not all embodiments require a roof to be present.

The concrete slab may be either rectangular or elliptical, defined by a length and a width. In the embodiment illustrated in FIG. 2A, the rectangular concrete slab is a rectangle with a length equal to its width, ie. a square. Similarly, in another embodiment the slab may be circular, as a special case of an ellipse with equal length and width. In the illustrated embodiment, a single rotary fan is used to address the whole slab area, but in other embodiments, more than one rotary fan may be used to provide air flow over the entire slab. In one embodiment the number of fans is in the range of 1-64. Implementing movable beams and vacuum/deposition heads that can move over the entire concrete slab is possible with either a rectangular, or an elliptical concrete slab. Each geometry has advantages and disadvantages.

Referring again to FIG. 2A, a rotary fan (206), with diameter equal to the larger of the length or width (or diameter, in the case of a circle) of the concrete slab, blows air at large volumes, but with low velocity, down onto the surface of the powder. At the edges of the concrete slab are walls (202) to contain the powder, so that the powder remains on the concrete slab even after a heavy rain, when the powder may temporarily become a slurry. 5-10 meters beyond the edges are 5 m high screen walls (201) to deflect and slow ground-level winds, protect the powder, and minimize the amount of powder that might blow into the air and affect nearby plants and trees. These screen walls may not be present in all embodiments. Finally, a surrounding area (210), may have the ground covered with a water-proof material to collect rainwater, which may be stored on-site for use in the process (not shown). Not all embodiments will include such means for rain collection.

Like electricity-generating wind turbines, space is required between carbon dioxide collection units so that each unit can receive air with a full-compliment of fresh air, containing carbon dioxide to be captured. Adjacent to the concrete slab are shown a kiln (208) for releasing the captured carbon dioxide and re-cycling the powder, and a compressor (209) to compress the captured carbon dioxide.

Referring again to FIG. 2A, in one embodiment, the particles in the powder are mixed with enough air so that the powder can be pumped through pipes. Often, this will entail reducing the density of the carbon dioxide absorbing powder to less than 50% of the density that the particulate material would have in solid form. The mixture is then pumped from the kiln onto the concrete slab through pipes and flexible hoses and one or more vacuum/deposition heads (207). For clarity, the rigid and flexible pipes from the kiln to the vacuum/deposition heads are not shown in FIG. 2A. The vacuum/deposition heads are mounted and move along one or more movable beams (204) that span the width of the concrete slab. Also, attached to each moveable beam is a stirring apparatus that stirs the powder on the slab as the beam moves. The ability to pump the powder through pipes, and distribute and re-collect it with an automated, computer-controlled distribution system, consisting of simple, low-cost, light-weight mechanisms, is essential to achieve a low-cost solution.

Pumping the powder through flexible pipes and then depositing it or vacuuming it with moving beams onto which are mounted movable vacuum/deposition heads is one low-cost apparatus for depositing the powder on a large area slab. Another low-cost apparatus is a conveyor. In one embodiment, the powder is moved onto and off of the slab with a conveyor, instead of being pumped through flexible pipes. In one embodiment, the conveyor is a belt with a top surface positioned approximately at the same height as the top of the slab. For this embodiment, the stirring apparatus attached to the moveable beams not only stirs the powder, but also distributes the powder over the slab by moving some of the powder in the direction of the motion of the beam.

For a rectangular slab, the conveyor belts extend across the slab parallel to the stirring beams, with at least one conveyor belt for each stirring beam. In a circular geometry, the stirring beam or beams are radial and at least one conveyor belt is also radial. In either geometry, the stirring apparatus moves some of the powder in its direction of motion, with each sweep. After the powder has captured the desired amount of carbon dioxide, the conveyor is energized in the direction to remove powder. Every time the stirring beam passes over the conveyor, some of the powder is removed. After a few hours, the stirring apparatus has moved most of the power onto the moving conveyor, which has removed it. Then, the direction of the conveyor is reversed, so that it can bring new powder onto the slab.

Again, the stirring apparatus moves some of the powder in its direction of motion, and, thereby, will distribute the new power over the slab.

Figure 2B:
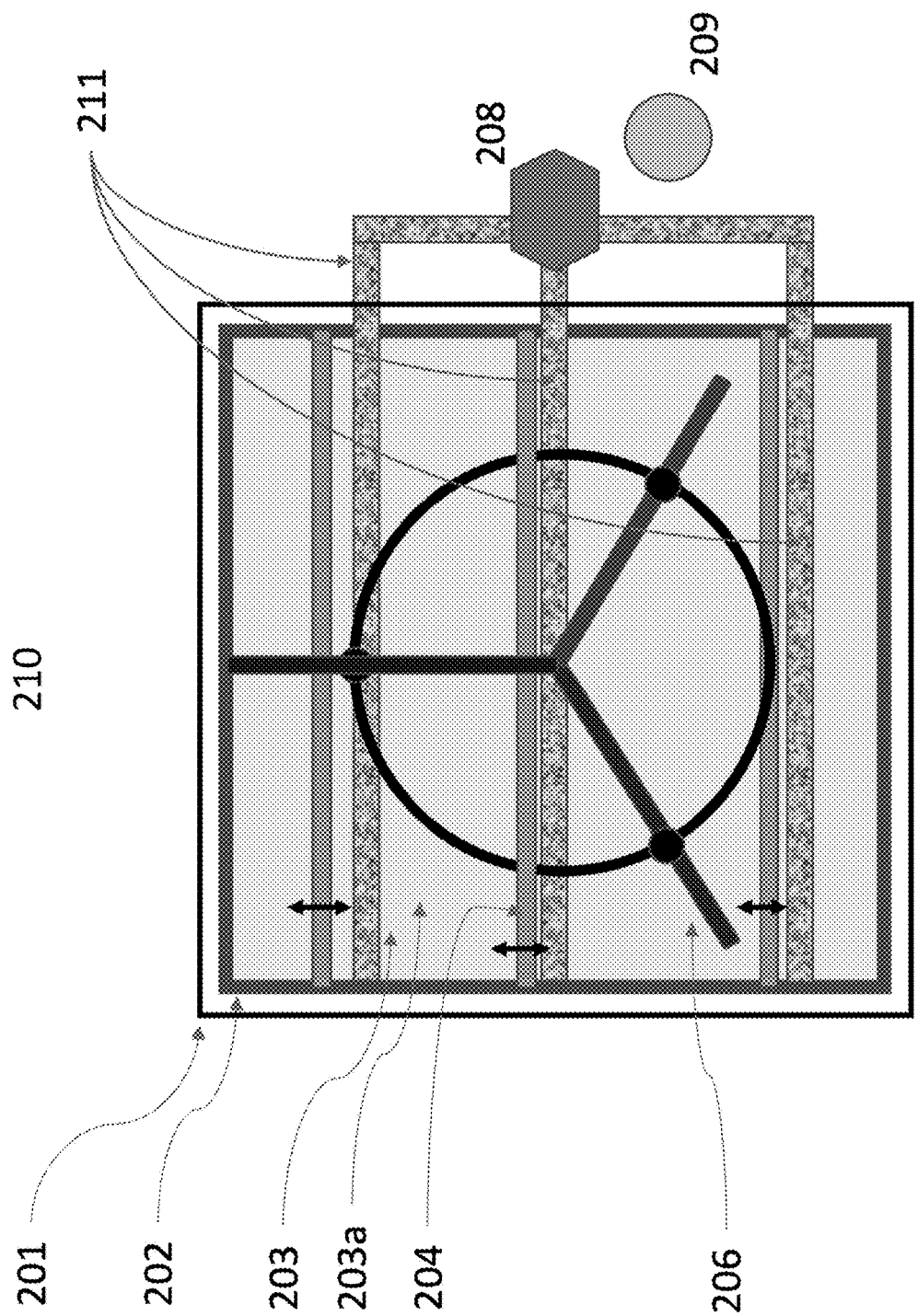
FIG. 2B is an illustration and top-down view of an outdoor apparatus for capturing carbon dioxide directly from the air, according to another embodiment.

The embodiment with a conveyor is illustrated in FIG. 2B. It is the same as FIG. 2A, except that the vacuum/deposition heads (labelled 207 in FIG. 2A) are replaced by conveyors (211). In the rectangular geometry shown in FIG. 2B, there are 3 stirring beams and 3 conveyors. When the areas served by the stirring beams do not overlap, there must be at least one conveyor for each stirring beam and its area. Each conveyor is located toward the middle of the area served by its corresponding stirring beam so that powder brought in by the conveyor can be pushed by the stirring beam and powder pushed by the stirring beams can be removed by the conveyor. In a circular geometry, regardless of the number of stirring beams, there can be one or more conveyors.

The movable beams, which in these embodiments also serve as stirring beams, are described further below. They are moved up and down the length of the concrete slab so that every part of the concrete slab can be serviced by one of the vacuum/deposition heads or one of the conveyors. In other embodiments, not shown, the beams on which the vacuum/deposition heads are mounted may be a separate set of beams.

For an elliptical slab with equal width and length (a circle), the moveable beam or beams may extend radially from the center and rotate around the circle in one direction. They may also rotate in one direction, reverse and then rotate in the other direction.

Attached to the bottom of each stirring beam is a stirring apparatus that mixes powder from various depths within the powder layer. The combination of one or more stirring beams and their back-and-forth motion along the length of the concrete slab provides stirring for the powder on every part of the concrete slab. It also moves some fraction of powder in the direction of motion of the beams.

While the carbon dioxide capture unit can be designed with a wide variety of dimensions, in one embodiment, a convenient choice is a concrete slab that is 180 m×180 m with a 0.5 m perimeter wall surrounded by a 200 m×200 m, 5 m high screen wall. The perimeter wall height is chosen to hold the powder when the slab fills with water after a heavy rain. It also shields the edges of the powder from wind. The height will depend on typical rain and wind for that location. The screen wall is present to protect the powder on the concrete from ground-level winds and protect local plants and trees from excessive exposure to the powder. It is further surrounded by a 400 m×400 m area (the full extent of which is not shown in FIGS. 2A and 2B) in which to collect rain. Of course, water may also be available from local streams and rivers or the ocean.

For collecting 4000 tons of carbon dioxide per week, depending on the exact choice for the carbon dioxide absorbing particulate material, roughly 8000 tons of absorbing powder must be deposited, and over 10,000 tons of powder containing powdered material that has absorbed CO2, must be collected from the slab every week. At 50% density, the density of the powder is 1.1-1.35 times the density of water. With pumps, flexible pipes, and vacuum/deposition heads, the flow rate of 50% particulate material mixed with air is roughly 1.5 m$^3$/minute—roughly the equivalent of 10 swimming pool pumps operating in parallel. This is simple and inexpensive. On the other hand, if this was done with people and trucks, the cost would enormous.

if the powder is on the slab for 1 week, and the powder is 50% dense relative to its solid state, so that it can be pumped, the required depth of powder on the slab is approximately 0.25 m. In other embodiments, if the slab is much smaller or much larger, the thickness of the powder layer would be correspondingly larger or smaller, possible ranging from 0.1 m-1 m in thickness. In one embodiment, 0.5 m high perimeter walls at the edge of the 180 m×180 m concrete slab contain the powder.

In many embodiments, the height of the walls should be about twice the thickness of powder, and at least 0.25 m higher than the powder to protect the powder from wind and to allow for 10" of rainwater that could turn the powder into a slurry and increase the volume of material in the confined area within the walls of the slab. Of course, embodiments that include a roof will not get heavy rain or snow, directly onto the slab and its powder. In embodiments with large slabs and a minimum thickness of powder, wall height above the top surface of the slab should be at least equal to the thickness of powder. The perimeter walls will contain the powder, in general, and especially, in the event of a heavy rain that can temporarily turn the powder into a slurry. In all embodiments, the combination of a slab and a perimeter wall extending above the top surface of the slab forms a receptable, a large, shallow, walled "pond", containing powder instead of water, where "large" is understood to mean that the receptable has an area of the order of hundreds of sq. m, typically at least 400 sq m.

Once more referring to FIG. 2, in one embodiment, over the concrete surface are 3 moving stirring beams that move up and down along roughly ⅓ of the length of the concrete slab. Underneath the entire length of these stirring beams is a stirring apparatus, such as the one illustrated in FIG. 3. The stirring beams move back and forth in the direction perpendicular to their length, at a speed (3 m/sec) that results in the powder being stirred roughly every 20 seconds. The 3 stirring beams support 3 vacuum/deposition heads that can move along the beams and, combined with the movement of the stirring beam, deposit or vacuum the powder onto and off every part of the concrete.

Figure 3A:
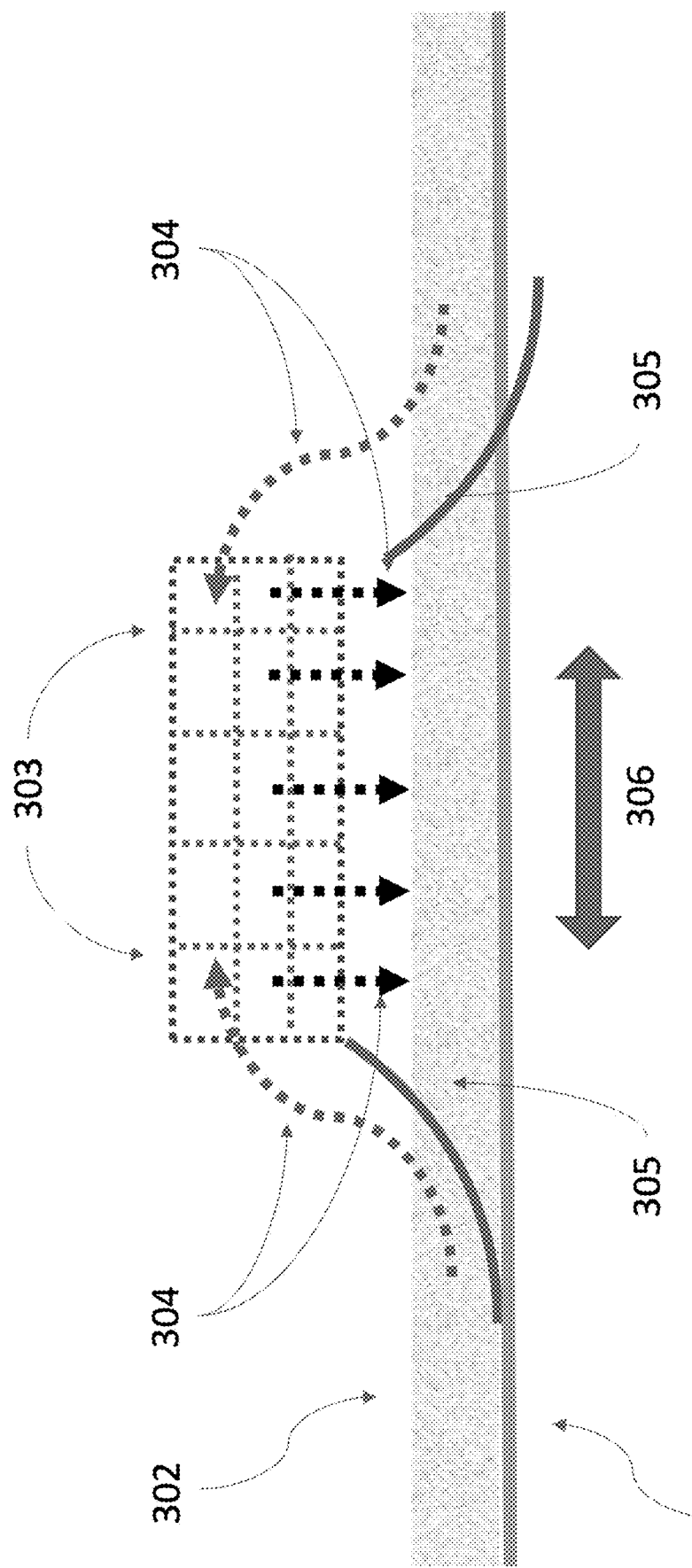
FIG. 3A is a cross-section view of parts of a stirring mechanism, according to one embodiment.

Illustrated in FIG. 3A is one example of parts of a stirring mechanism. There are many possible designs that will work. In a rectangular geometry, the beams move in both directions (306). In one embodiment, the stirring mechanism works only in one direction and the stirring beams move back and forth twice as fast to achieve the same rate of stirring. In one embodiment, the stirring mechanism works in both directions. In a circular geometry, the beams may rotate only in one direction. For this case, the stirring mechanism only needs to work in one direction.

Figure 3B:
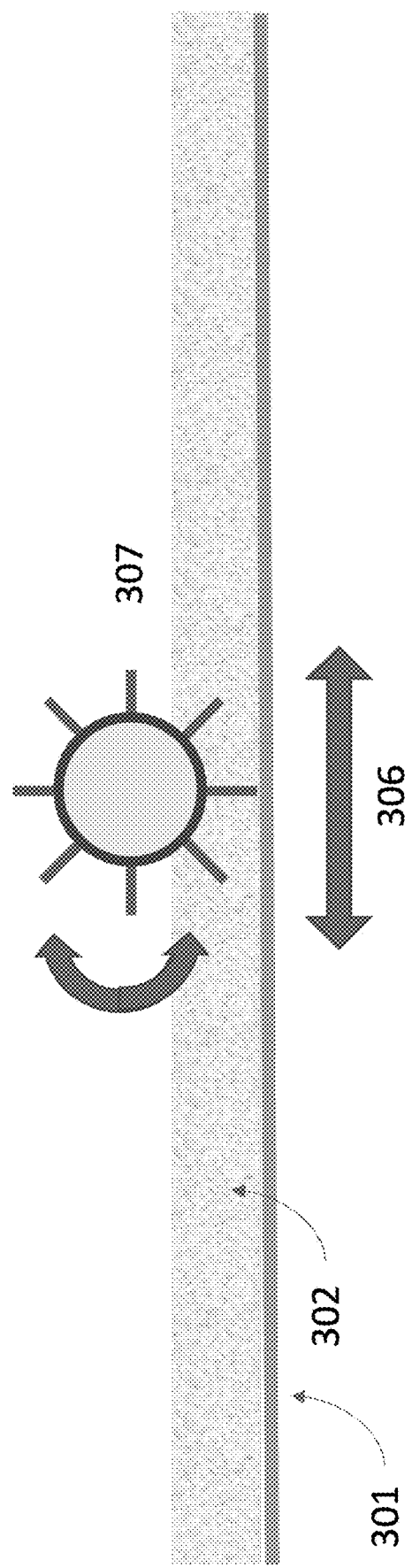
FIG. 3B is a cross-section view of parts of a stirring mechanism, according to another embodiment.

As shown in FIG. 3A, for this example of a bi-directional stirring mechanism, flexible ramps (305) lift the particulate material in the powder (302) off the concrete slab (301). The powder passes (304) through a set of horizontal and vertical screens (303) that break up caked powder and mix the powder so that powder from the bottom, middle and top sublayers are mixed. The powder then falls back onto the concrete slab. Other embodiments may include more screens, screens of different pore size, and different shapes for the flexible ramps. FIG. 3B illustrates one embodiment of parts of a stirring mechanism with a rotating brush (307) that lifts and mixes the powder.

For depositing the powder onto the concrete slab, the particulate material is introduced into a rapidly flowing air stream, pumped through flexible pipes, and into the vacuum/deposition heads from which it flows onto the concrete surface. After it has collected carbon dioxide from the air, the powder is collected by pulling a vacuum through the vacuum/deposition heads and flexible pipes. Again, the particulate material is pushed by a rapid air flow, and then separated from that air flow by a collection of baffles, spin vortices, and filter screens common to vacuum devices. Pumping and vacuuming the powder provides a low cost means to handle the huge amount of material necessary for collecting 4000 tons of carbon dioxide each week. The pump power required is minimal, circa 10 hp, and the operating costs are an insignificant part of the total carbon dioxide capture cost, less than a few pennies per ton of captured carbon dioxide.

In one embodiment, air with 400 ppm carbon dioxide is delivered to the top surface of the powder by a 180 m diameter fan with blades that are twisted so that the air velocity from the center of the fan out to the outer edges of the fan is roughly constant. To collect 4000 tons of carbon dioxide per week, air flow must be huge, about 10,000 $m^3$ per second. Since the surface area of the powder is also huge (32,000 sq m), the velocity of air down to the top of the powder is low, about 0.275 m/sec. A low air velocity is essential and should be less than about 1.5 m/sec. Otherwise, the powder could be blown off the concrete slab and into the air. In addition, the power required for the fan scales as the velocity cubed. A low air velocity over a huge area enables the fan to turn slowly, use very little power, and still provide the huge volume of air necessary to collect 4000 tons of carbon dioxide per week.

For this low air speed, depending on the exact pitch of the twisted fan blades, the fan rotates very slowly, circa 1 revolution per minute. In various embodiments, depending on the fan diameter, number of blades, and blade pitch, the rotation speed is determined by providing the necessary downward air velocity and, often, a little extra, so that the reaction rate of collecting carbon dioxide is not limited by the rate of downward air flow. In various embodiments, the number of fan blades is in the range 1-64. More blades will produce a steadier air flow. Unlike modern wind turbines, the blades can be supported with a number of metal rings and possibly several rods angling downward from a center pole. The fan is illustrated in FIG. 2 with 3 blades and one supporting ring, but without any supporting rods.

Modern wind turbines are designed to minimize turbulence in order to obtain maximum efficiency. In one embodiment, the blades of the fan are designed to intentionally promote turbulence. Without turbulence, a boundary layer will form at the top surface of the powder. As carbon dioxide is absorbed by the powder, additional carbon dioxide will have to diffuse across the boundary layer. With the very low concentration of carbon dioxide in air, the diffusion of carbon dioxide though air is much too slow to support the high reaction rates necessary to absorb 4000 tons of carbon dioxide per week. Turbulence causes mixing of the air and shrinks the boundary layer of air at the top surface of the powder.

Reynolds numbers above 2500 support turbulent air flow. The shape, thickness, and width of the fan blades are chosen to promote turbulence, with a Reynolds number that is more than 10 times this threshold value. Although most designers of fans and wind turbines focus on minimizing turbulence, one skilled in the art is well aware of designs that create turbulence and can be optimized to create sufficient turbulence for this application.

Once the carbon dioxide reaches the top surface of the powder, it must flow below the top surface of the powder by diffusion. As particulate material in the powder at the top surface reacts, the carbon dioxide must penetrate deeper below the top surface to come in contact with unreacted powder.

The rate of transport of carbon dioxide into the powder by diffusion is inversely proportional to the distance from the surface. In effect, limited by the diffusion rate of carbon dioxide in air, only the top 60 μm of the powder can be accessed by carbon dioxide at a rate sufficient to capture 4000 tons per week. Therefore, the powder must be frequently stirred to put fresh, unreacted powder within 60 μm of the very top surface. Toward the end of the week, when over 70% of the material particles in the powder in an area of the concrete slab have already collected carbon dioxide, the powder must be stirred even more frequently.

Frequent stirring is a key aspect of this invention. Without frequent stirring, it would take a year or more for the powder to completely absorb its full measure of carbon dioxide. With frequent stirring, it can absorb its full measure, 4000 tons of carbon dioxide, each week. Stirring must be frequent enough to assure that the material within 60 μm of the top surface of the slab, into which carbon dioxide from the air can diffuse at the necessary rate, is constantly refreshed, and always has a concentration of carbon dioxide absorbing particulate material of at least 10% by weight. In one embodiment, the powder is stirred at the most frequent rate required all the time, circa every 20 seconds. For a concrete slab that is 180 m×180 m, and a stirring mechanism that stirs in both directions, the 3 stirring beams must move at a speed of roughly 3 m/sec.

The geometry of the stirring mechanism must be designed such that particulate material from the bottom, middle and top regions or sublayers of the whole layer is thoroughly mixed when the stirring beam passes a location. It must also break up caked powder and any powder "skin" that may form on the top surface from the reaction with water vapor, water, and carbon dioxide. This is easy when the powder is free flowing, but more difficult when the powder is somewhat caked due to high humidity. The stirring mechanism must break up any caked powder and thoroughly mix the particulate material top to bottom.

In one embodiment, the average diameter of the particles in the powder is in the range of 50-100 μm. The particles are highly porous to adsorb water and offer a large surface area to accelerate the reaction with carbon dioxide from the air. In humid environments, the powder will most likely cake. In dry spells, between rains, the powder might get too dry and, in one embodiment, is sprayed with water to keep the finer powder from blowing away. The stirring mechanism is designed to break up the cakes of powder and refresh the top sublayer, next to the top surface of the powder on the slab, without generating too much dust that can blow away.

In one embodiment, each day, in an area equal to ⅐ of the total concrete slab area, week old powder is vacuumed and replaced with powder containing particulate material that has been heat treated to remove the carbon dioxide and restore the ability of the particles in the powder to collect new carbon dioxide. Each day, a different ⅐ section of the total area is vacuumed and fresh (heat treated) powder is deposited. In this way, powder in any section remains on the slab collecting carbon dioxide for a week.

In another embodiment, the powder is placed on a fine mesh screen at least 3 m above the concrete slab. One or more rotary fans are placed above the concrete slab and just under the screen. Air is drawn in from the perimeter of the slab and blown up by the fan(s) through the screen, through the powder and out into the air above the powder. A roof above the mesh screen and powder protects the powder from direct rain and snow. As in other embodiments, the air velocity is low. Stirring can be less frequent since the air must travel through the entire thickness of the powder, but is still required to break up any caking or surface layers. Some powder will fall through the screen and through the fan to the concrete slab below. Occasionally, the concrete slab will have to be vacuumed and this powder transported to the kiln.

The choice of particulate material is critical. In one embodiment, the material must readily absorb carbon dioxide from the air and it must give up its carbon dioxide easily, without requiring too much energy, so that it can be recycled in a heated kiln and returned to slab as small diameter particles to collect more carbon dioxide. It must survive well in outdoor environments, with sunlight, oxygen, temperature variations, rain, snow and freezing weather, and various pollutants, like $SO_2$ and $NO_x$. Access to huge volumes of fresh air with a full concentration of carbon dioxide is most easily and inexpensively achieved outdoors. Some of the powder may be lost due to high winds. Therefore, the particulate material must be inexpensive, easy to replace, and environmentally acceptable.

In one embodiment, limestone ($CaCO_3$) is a preferred starting particulate material. Limestone is one of cheapest materials in the world and well-suited to an outdoor environment. In addition, any $Ca(OH)_2$ present in the powder, unreacted with carbon dioxide, will, as soon as it is blown into the air, react with carbon dioxide and quickly become $CaCO_3$, which is relatively harmless to plants, and often added as a soil amendment.

Initially, as an input, limestone may be crushed and converted into slaked lime powder ($Ca(OH)_2$) in the kiln, before being placed on the slab for the first time. Many other inorganic chemicals will work, such as NaOH (and other Periodic Table group I) hydroxides, other group II hydroxides, such as $Mg(OH)_2$, and several transition metal oxides or hydroxides, such as FeO, and even some trivalent oxides or hydroxides, such as $Al(OH)_3$. Even zeolites (aluminosilicate crystals) would work, but are too expensive at the present time.

For $Ca(OH)_2$, the basic (reversable) chemical reaction by which carbon dioxide is absorbed is:

$$Ca(OH)_2 (powder) + CO_2 (gas\ from\ air) \leftrightarrow CaCO_3 (limestone\ powder) + H_2O (water\ vapor)$$

The reverse reaction to release the carbon dioxide ($CO_2$) and restore the $Ca(OH)_2$ has two steps:
(1) $CaCO_3$ (powder)+heat→$CO_2$ (gas)+CaO (powder)
(2) CaO (powder)+water vapor→$Ca(OH)_2$ (powder)+heat In other embodiments, other metal hydroxides are used to capture $CO_2$ from the air. A similar set of reactions occur and a similar set of recycling reactions are utilized. For the purpose of illustrating one process in detail, the discussion below focuses on the recycling reactions and the kiln design for recycling $Ca(OH)_2$, which is used in one embodiment. However, in other embodiments, the kiln design is similar, although the exact temperatures and pressures may be different.

In one embodiment, if the $CO_2$ released in reaction (1) and the $H_2O$ (water vapor) used in reaction (2) are held at 1 atmosphere pressure (1 atm), reactions (1) and (2) will not occur at the same temperature. At 1 atm $CO_2$, $CaCO_3$ decomposes at about 925° C., while at 1 atm $H_2O$, CaO hydrates to become $Ca(OH)_2$ at about 500° C. Therefore, the heat produced by hydrating CaO cannot supply all of the heat necessary to decompose $CaCO_3$.

In one embodiment, some of the heat input required for the reaction (1), or a corresponding reaction for another metal carbonate, to decompose the carbonate and release $CO_2$ is supplied by natural gas or electricity. The heat produced by reaction (2) or a corresponding reaction for another metal oxide, to hydrate the oxide to a hydroxide is used to dry and heat the incoming materials, to boil water, and possibly to generate electricity. In one embodiment, the heat produced in reaction (2) is also used to drive the compressors that compress the $CO_2$ released in reaction (1) and a small generator that supplies electricity for the pumps and fans, and that creates extra, carbon-free, electricity that can be sold. For this case, the total heat required to recycle $CaCO_3$ to $Ca(OH)_2$ and compress the $CO_2$ is about 178 kJ/mole of $CO_2$. In other embodiments, for recycling other metal carbonates, the exact amount of energy required will vary.

In another embodiment, for recycling $CaCO_3$, the steam pressure for reaction (2) is raised to around 100 atm or roughly 1500 psi. At this pressure, the reaction temperature is elevated to 925° C. and the heat produced by reaction (2) can be used directly to drive reaction (1). For this case, the total energy required is less, about 118 kJ/mole of $CO_2$. However, electricity must be imported or generated on-site to drive the compressors, fans, and pumps, and there is no extra electricity to sell.

Figure 4A:
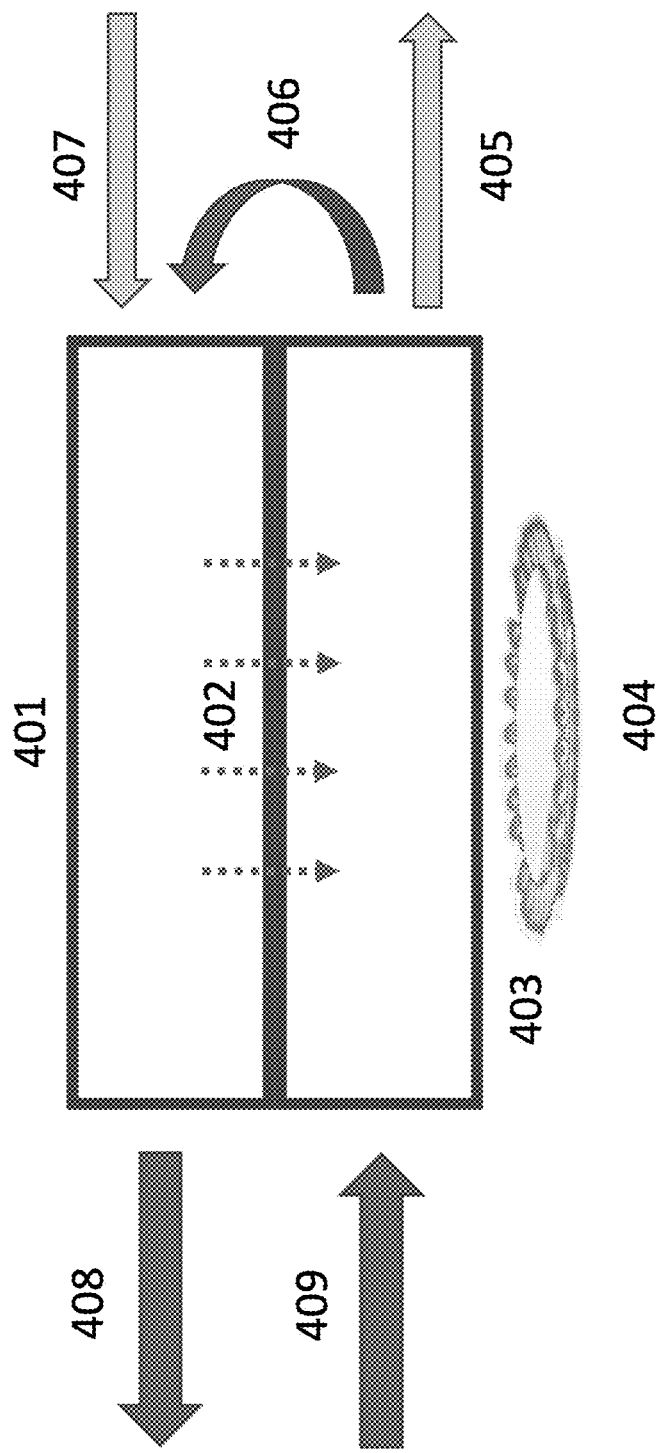
FIG. 4A is an illustration of a two-chamber kiln, closed to the atmosphere, according to one embodiment.

One embodiment, shown in FIG. 4A, uses a two-chamber kiln that is closed to the atmosphere. Heat (404) is supplied to one chamber (403) of the kiln, where $CaCO_3$ (powdered limestone) or another metal carbonate (409) is decomposed to create CaO or another metal oxide (406) in particulate form, and release carbon dioxide (405). The carbon dioxide is collected and compressed for transport and storage. In a second chamber (401), in close thermal contact with the first chamber (403), the particles of CaO (or another metal oxide) (406) transferred from the first chamber are hydrated by being exposed to steam (407), which converts the particles of CaO (or another metal oxide) to particles of $Ca(OH)_2$ (or another metal hydroxide) (408) and releases lots of heat (402). Not shown is a pre-treatment of the incoming $CaCO_3$ to heat it and drive off any absorbed water.

Figure 4B:
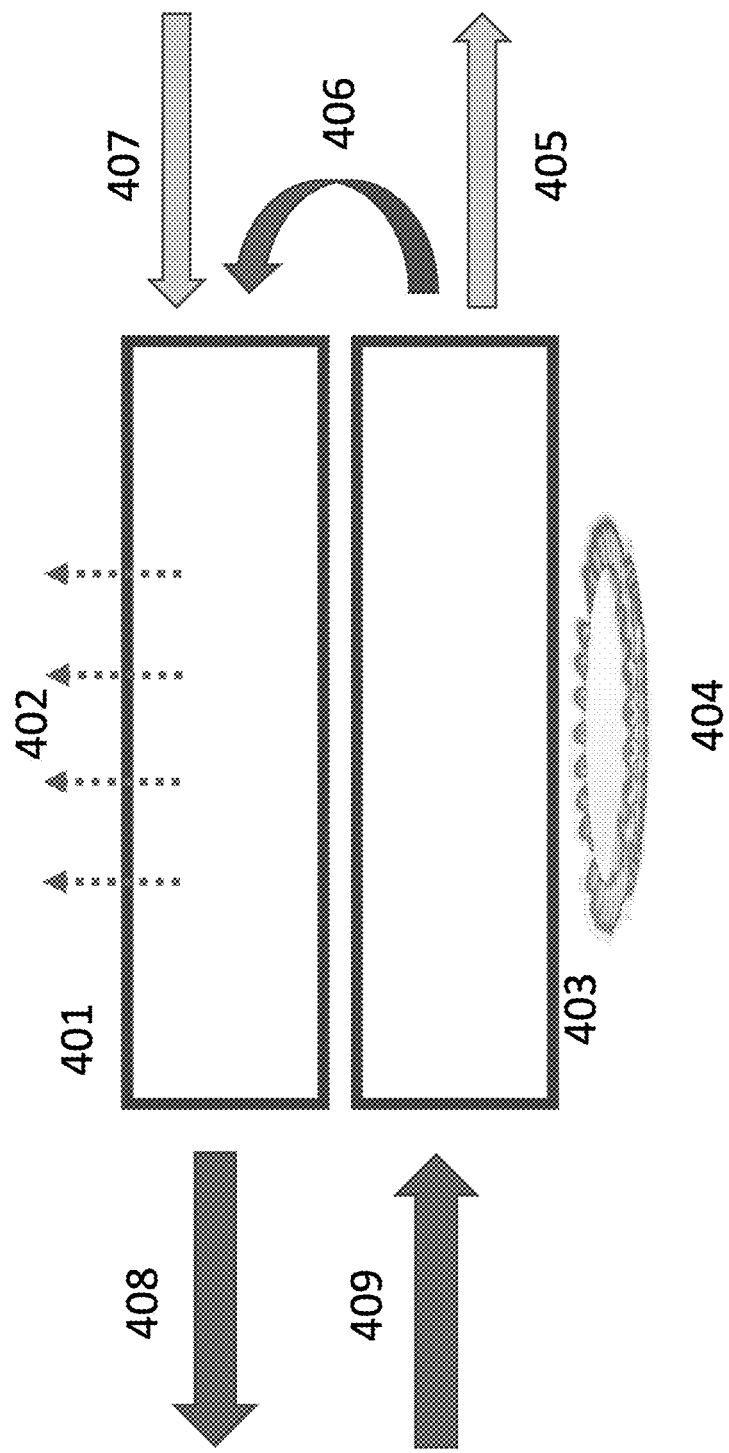
FIG. 4B is an illustration of a two-chamber kiln, closed to the atmosphere, according to another embodiment.

As discussed above, if both chambers are operating at the same temperature, (circa 925° C.), then the heat produced in the second chamber is conducted to the first chamber (402). In another embodiment, the steam pressure is lower, and temperature in the second chamber is lower than in the first. For this case, illustrated in FIG. 4B, the two chambers are not in close thermal contact and the heat produced in the second chamber is used to heat incoming material, boil water, drive the compressors, supply electricity for the pumps, fans, and movers, and produce electricity for sale.

In another embodiment, the kiln has only one chamber, in which the metal carbonate is decomposed with heat from electricity or natural gas, forming a metal oxide that is not subsequently hydrated within the kiln. Instead, the oxide particles are mixed with air to form a powder and pumped from the kiln onto the flat slab to collect water vapor and carbon dioxide from the air. The heat produced when the metal oxide collects water from the air and becomes a hydroxide is not collected but flows into the air over the slab. This embodiment is simpler, but somewhat wasteful of energy, since the heat produced during hydration is not collected and utilized. In the embodiment where CaO is sent from the kiln to the slab and used to collect carbon dioxide, 178 kJ/mole of energy will be needed in the kiln, instead of 118 kJ/mole, the net energy requirement for a $Ca(OH)_2$ embodiment in which energy produced during hydration is collected and utilized. On the other hand, there are some advantages to this one chamber embodiment. No water collection is required, and a single chamber kiln is sufficient.

For the combination of the three reactions shown above, in theory, no net water is required. When $Ca(OH)_2$ (or another metal hydroxide) absorbs $CO_2$, it produces water vapor. In theory, this water vapor could be collected and used to convert CaO to $Ca(OH)_2$ (or convert another metal oxide to a metal hydroxide). However, in practical embodiments, the $CO_2$ is absorbed on a large concrete slab and is absorbed from a huge flow of air. This huge flow of air also absorbs the water vapor given off.

Compared with the amount of water vapor normally in air, this additional water vapor is insignificant. It cannot be easily collected. Therefore, a source of additional water is required, and additional heat is required to turn that water into water vapor (steam).

The kinetics of the carbon dioxide absorption reaction are a little more complicated. In one embodiment, $Ca(OH)_2$ is used to collect carbon dioxide, although as previously noted, other metal hydroxides could be used instead. In the following discussion, $Ca(OH)_2$ is used as an example to discuss an issue that will apply more or less to the use of various metal hydroxides.

Each particle of $Ca(OH)_2$ has a thin film of water surrounding the particle. The amount of water surrounding each particle depends on the relative humidity in the air. Higher humidity results in more water on the $Ca(OH)_2$ particles. Carbon dioxide from the air dissolves in the water layer and forms carbonic acid ($H_2CO_3$). The amount of carbon dioxide that dissolves is increased with decreasing temperatures. Some of the $Ca(OH)_2$ also dissolves in the water layer. Its solubility also increases with decreasing temperature.

In the water layer, there is a typical acid-base reaction, in which:

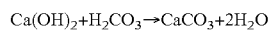

$$Ca(OH)_2 + H_2CO_3 \rightarrow CaCO_3 + 2H_2O$$

If the relative humidity is high, the water produced keeps the local humidity high and the reaction proceeds quickly. If the humidity is low, the water evaporates and the reaction slows. For a rapid reaction, the requirement is high humidity (greater than 50%) and low temperature. The amount of carbon dioxide in solution is twice as high at 5° C., as it is at 25° C. The same is true for the amount of $Ca(OH)_2$ in solution. Hence, the reaction rate will be higher at lower temperatures. In other embodiments, other materials can be used, like Na(OH) or $Mg(OH)_2$. However, many of these materials do not dissolve well in water and many require a larger amount of heat to release their carbon dioxide.

In one embodiment, to promote rapid absorption of carbon dioxide, the kiln temperature is kept relatively low (eg. 900° C.-1200° C.). Lower temperatures will require more time in the kiln, but will form particles that are small and highly porous. Small particles and highly porous particles have greater surface area on which the water film can accumulate and will enhance the rate at which carbon dioxide is absorbed. A highly porous particle is defined as a particle with an effective surface area that is at least 10 times the diameter squared of the particle.

Standard kiln processes have the opposite goal. Cement makers do not want their $Ca(OH)_2$ (aka slaked lime) to absorb carbon dioxide from the air. They want it to remain as lime until it is mixed with water and sand, and can react with the sand to form $CaSiO_3$. Therefore, they kiln at high temperatures (1450° C.) and produce larger particles, with larger crystallites, that are dense, rather than porous.

At low kiln temperatures (900° C.-1200° C.), CaO forms as small particles, often with average diameters of less than 100 μm, that are highly porous, with many small crystallites in each particle, as evidenced by the rate at which they absorb carbon dioxide from air with 50% relative humidity. In one embodiment, the kiln pressure is 1 atmosphere of $CO_2$ (1 atm), and the kiln temperature is in the range of 900° C.-1200° C. Within this range, higher temperatures will make the reaction go faster, as will the presence of a trace of water vapor. In another embodiment, temperatures lower than 900° C. can also be used with a lower $CO_2$ pressure.

In one embodiment, CaO is converted to $Ca(OH)_2$ at temperatures of about 500° C. and a steam pressure at about 1 atm. These parameters form small, highly reactive particles, with lots of tiny pores, and, often, with an amorphous crystal structure. In one embodiment, CaO is converted to $Ca(OH)_2$ at temperatures around 925° C., with 100 atm of steam. These parameters also form small particles, with lots of tiny pores, and, most likely, with an amorphous crystal structure.

Particles that are too large will not react quickly enough to absorb large amounts of carbon dioxide in a short time. In all embodiments, kiln temperatures and pressures must be maintained to produce particles with an average diameter smaller than 500 μm in diameter. Smaller particles have larger total surface area. Particles with lots of pores that absorb water, greatly increases the rate at which $Ca(OH)_2$ can absorb carbon dioxide. In all embodiments in which such highly porous particles are to be provided, temperature and other kiln parameters, such as steam pressure, water content of the $CaCO_3$, stirring, and so forth are optimized to produce particles of $Ca(OH)_2$ that are small in diameter, and highly porous, preferably with an amorphous crystal structure.

Particles that are too small also present a problem. They can float in the air and be carried away by the wind as dust. In another embodiment, kiln temperatures, pressures and other parameters are also maintained so as to produce particles with an average diameter larger than 5 μm. In various embodiments, the particles of the carbon dioxide absorbing material pumped or conveyed to the slab have typical average diameters in the range 50 μm-100 μm with a maximum range of 5 μm-500 μm.

Over time, after many weeks of absorbing carbon dioxide and being recycled, more and more very fine particles of $Ca(OH)_2$ may form. In some embodiments, after leaving the kiln, the particles of $Ca(OH)_2$ are stored for a few days, with some air flowing through the powder, to allow the smallest particles to absorb water from the air, agglomerate into larger particles, and reduce the amount of dust that can blow away.

In one embodiment, water to convert CaO to $Ca(OH)_2$ is supplied from a combination of collected rainwater, and from the water adsorbed from the atmosphere in the pores of $CaCO_3$ particles on the slab. The $Ca(OH)_2$ particles are small and have an amorphous crystal structure. The change in volume when $Ca(OH)_2$ becomes $CaCO_3$ is small (circa 10%). Hence, the $CaCO_3$ will have a similar particle size and porosity, and will adsorb water on its surface and into its porous structure.

Figure 5:
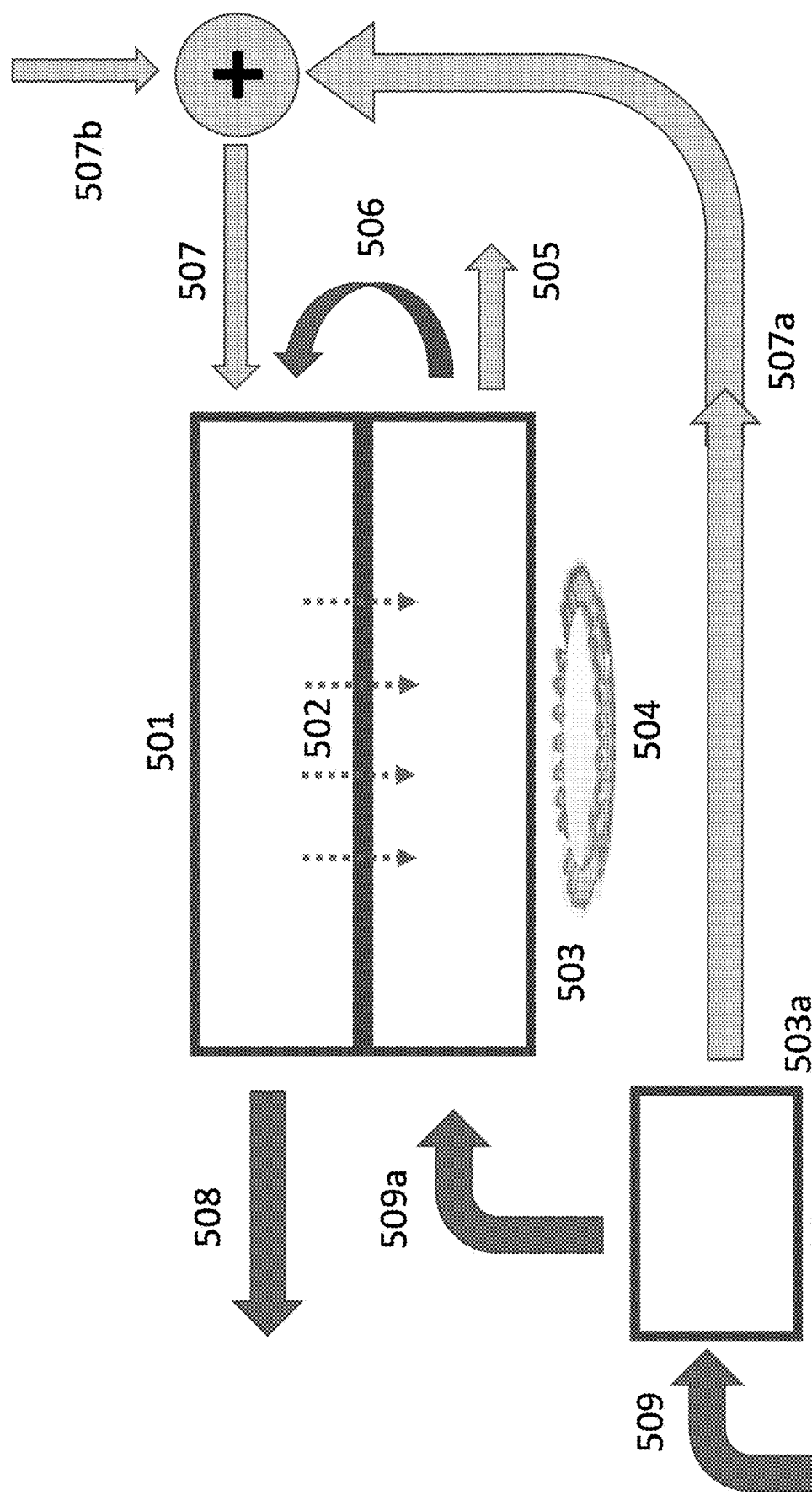
FIG. 5 is an illustration showing how powdered material may be pre-heated to collect adsorbed water before entering a kiln, according to yet another embodiment.

As shown in FIG. 5, before entering the kiln, the $CaCO_3$ (509) is heated in chamber 503a to 100° C. or higher to release its adsorbed water (507a). Then, the dry $CaCO_3$ (509a) is transferred to one chamber (503), of the kiln where it is heated (504) and releases its $CO_2$ (505). If wet $CaCO_3$ were to be transferred directly to the kiln, the $CO_2$ released might also contain water.

The water vapor (507a) is added to steam from boiling water (507b) and is used in the other chamber (501) of the kiln, in which CaO (506) is converted to $Ca(OH)_2$ (508). Then, newly incoming dried $CaCO_3$ (509a) can be heated by heat (502) that was previously generated in the kiln by the reaction of CaO+H$_2$O→Ca(OH)$_2$+heat, and by heat generated by the burning of a small amount of natural gas (504). In other embodiments, some of all of the heat can be supplied by electricity, collected solar energy, or other fuels such as hydrogen.

In one embodiment, the Ca(OH)$_2$ (508) output from the kiln is relatively dehydrated. Once out in the air, with 50% relative humidity (or higher), it adsorbs water from the air, as does the CaCO$_3$ formed after Ca(OH)$_2$ reacts with CO$_2$.

At 9% water by weight, ½ of the needed water is adsorbed by the incoming CaCO$_3$. The remaining water is collected rainwater that is boiled to make steam. In one embodiment, the carbon capture units are placed on 400 m centers. With 10 inches of rainfall per year over 400 m×400 m, assuming that the rain can be collected quickly into an enclosed pool with little evaporation, 40,000 m$^3$ of water can be collected per year. Capturing 4000 tons of CO$_2$ per week, which is 208,000 tons of CO$_2$ per year, requires 83,000 tons of water or 83,000 m$^3$ per year. Hence, about ½ of the required water can be collected from rainfall and ½ from water adsorbed from the air by the small, porous particles of CaCO$_3$. In some cases, a local pond may be used to store rainwater before boiling; in others, water from local rivers or the ocean may be collected and boiled to create steam.

In one embodiment with 200.000 carbon collection units, each 180 m×180 m, located on 400 m×400 m lots, requiring 32,000 sq. km of land (12,500 sq miles), 40 billion tons of carbon dioxide can be collected per year. In one embodiment, when both the decomposition of CaCO$_3$ and the hydration of CaO are done at around 925° C., then the total heat required to convert CaCO$_3$ back to Ca(OH)$_2$ and to boil the required water requires about 2.5 MCF (thousand cubic feet) of natural gas per ton of captured CO$_2$. At the current market wholesale price of $2.70 per MCF, this is $6.77 in natural gas cost per ton of captured CO$_2$.

In other embodiments, the slab area is smaller and the total number of collection units is correspondingly larger. If the depth of powder on the slab is kept constant, then the amount of carbon dioxide collect per unit will scale with the slab area. In other embodiments, the areas of the slabs are at least 400 sq m in area, so that the cost of the kiln, compressor, fan(s), and powder transport system does not greatly increase the total cost per ton of carbon dioxide captured.

In addition, 90 kWh of electricity per ton CO$_2$ is required to compress the carbon dioxide to 75 atm. The heat of compression is used to make up part of the heat necessary to warm and boil water. At the wholesale cost of electricity from a southwestern U.S. solar farm ($1 per installed watt; 3% interest rate, 25 years) of $0.028 per kWh, this is an additional cost of $2.85 per ton of captured CO$_2$.

Burning natural gas to heat the CaCO$_3$ (see 504 in FIG. 5) and to boil water creates additional water and CO$_2$:

In one embodiment, the carbon dioxide and water vapor produced by burning natural gas are released to the air. Of course, this would subtract from the carbon dioxide captured and make the net amount captured smaller. In another embodiment, the carbon dioxide in the exhaust from the natural gas flame is captured. First, water vapor is condensed from the exhaust and added to water used to convert CaO to Ca(OH)$_2$. Second, the dry exhaust is passed through the powder collected from the slab, which typically still has some unreacted Ca(OH)$_2$ that absorbs the carbon dioxide from the natural gas flame exhaust. Finally, only nitrogen is left in the exhaust, which is released to the air.

Figure 6:
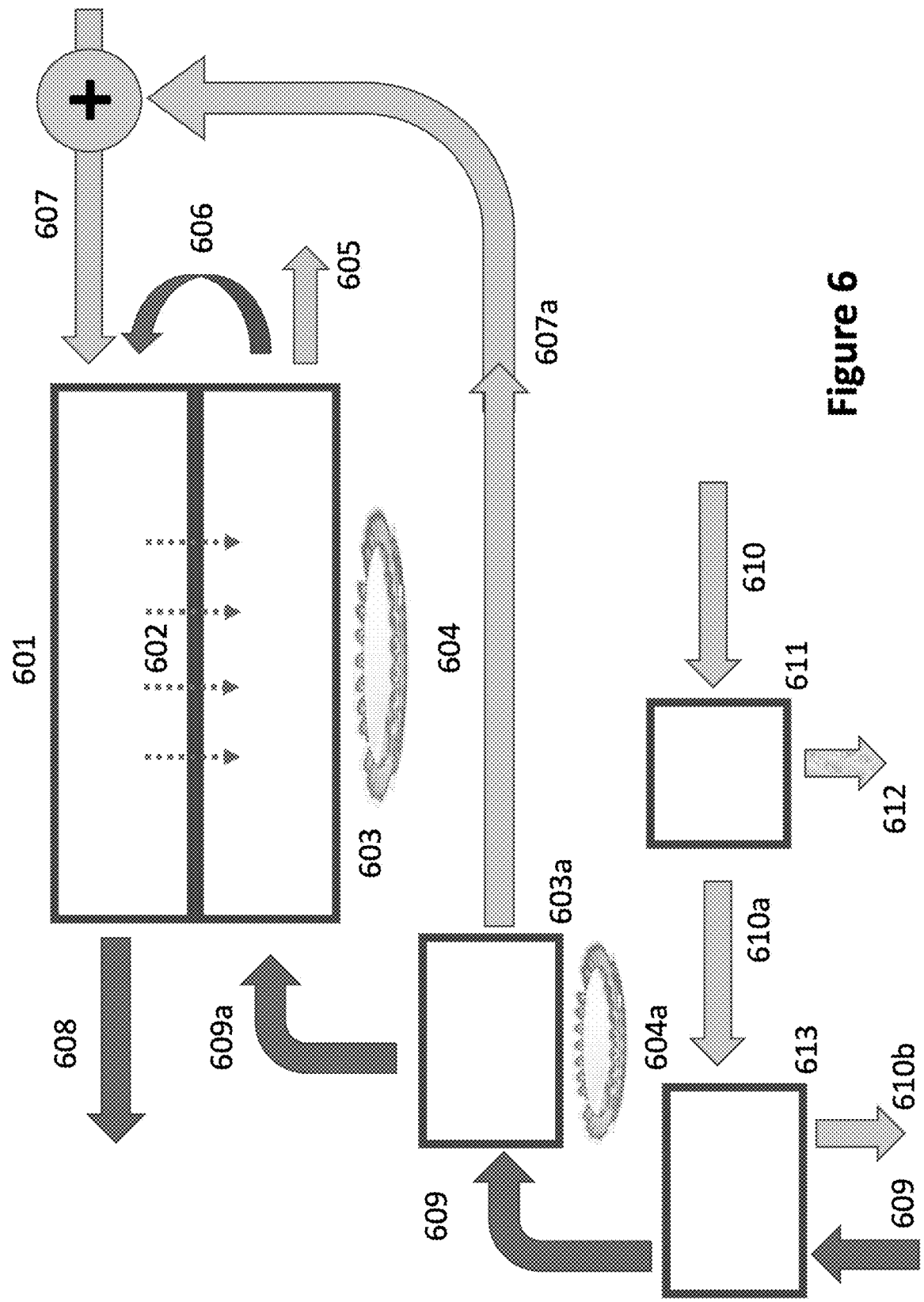
FIG. 6 is an illustration showing how exhaust from burning natural gas for kiln operation may be passed through a condenser to remove water, and then through the powdered material to remove carbon dioxide, according to another embodiment.

This embodiment is illustrated in FIG. 6. Exhaust from burning natural gas (610) is dried in chamber (611). The condensed water (612) is added to water (607) input to the chamber (601) that converts CaO (606) to Ca(OH)$_2$ (608). The dried exhaust (610*a*) continues to chamber (613) where it flows through and reacts with the powder (609) collected from the slab. The carbon dioxide in the exhaust is absorbed by the powder. Remaining is only nitrogen (610*b*), that is released to the air.

The powder collected from the slab (609) continues to chamber (603*a*), where it is heated by part of the natural gas (604*a*) to dry it. The dried powder (609*a*) proceeds to chamber (603), where the CaCO$_3$ particles are converted to CaO, and carbon dioxide is released and collected (605). The steam (607*a*) output from chamber 603*a* is added to steam created by boiling water (607), and enters the chamber (601) where CaO is converted to Ca(OH)$_2$.

As in FIG. 4A, the heat (602) from the reaction in chamber (601) is transferred directly to chamber (603). Additional heat is needed in chamber (603) and is provide by burning most of natural gas (604) required in the kiln.

Note that the kilns illustrated in FIGS. 5 and 6 both have the heat from the top chamber flowing directly into the bottom chamber, similar to the kiln illustrated in FIG. 4A. Not shown is a version in which the heat produced in the top chamber does not flow directly into the bottom chamber, where the two chambers are not in close thermal contact, and the heat produced in the second chamber is used to heat incoming material, boil water, drive the compressors, and supply electricity to the pumps, fans, movers, and for sale. The kiln in such an embodiment would be similar to that illustrated in FIG. 4B.

In one embodiment, when the hydration of CaO is done at a lower temperature and its heat is used to heat incoming material, boil water, drive the compressors, and produce and sell electricity, the amount of energy and natural gas required is greater. Still, the total cost for capturing carbon dioxide is very good, about $12.50 per ton of captured CO$_2$, including the cost of the energy to capture the CO$_2$ created by burning a greater amount natural gas. For this case, all of the input energy is from natural gas; no outside electricity is required.

Please note: as used here and throughout this specification, ton refers to metric ton, equal to 1000 kg.

In one embodiment, with Ca(OH)$_2$ as the material that collects carbon dioxide, Ca(OH)$_2$ can also react with air pollutants such as NO$_2$ or SO$_2$ to form Ca(NO$_3$)$_2$ or CaSO$_4$. Ca(NO$_3$)$_2$ will decompose in the kiln at 900-1200° C., but CaSO$_4$ will not. However, in the U.S., atmospheric concentrations of SO$_2$ pollutants average less than 0.01 ppm, 40,000 times less than the concentration of carbon dioxide in air (400 ppm). Thus, we could cycle the Ca(OH)$_2$ 1000 times before 2.5% of it would become CaSO$_4$. At one cycle per week, this would be 20 years. In 20 years, at minimal cost, we could collect the limestone powder (CaCO$_3$) with a little Ca(NO$_3$)$_2$ and CaSO$_4$, heat it above 1500° C. to release the pollutants, and sell it, likely as a soil amendment, and start over with fresh limestone powder. Of course, there are places where the level of air pollutants is much higher. These areas need to be avoided.

In general, the choice of location for carbon dioxide capture units is important. In one embodiment, preferred locations are those with mild winters, average yearly temperatures around 10° C., rainfall in excess of 10 inches per year, and humidity greater than 50%. As an example, the NE corner of California, the NW corner of Nevada, and the SE corner of Oregon have these attributes. If rainfall falls short, water can be pumped from the ocean or nearby rivers.

On the other hand, it might be desirable to have carbon dioxide capture units in as many states and as many countries as possible. Snow cover will prevent carbon dioxide from reaching the powder, but the reaction heat will melt light snowfalls. In one embodiment, a roof 5 m or more above the slab protects the powder on the slab from direct rain and snow. In another embodiment, there is no roof. Rain and snow hit the powder on the slab directly. Rainwater and the water from melting snow will have dissolved carbon dioxide that will be absorbed by the powder. The thermal mass of the concrete plus powder will hold the temperature of the powder close to the daily average temperature. The powder is white and reflects much of the sunlight. In another embodiment, while not preferred, most states in the U.S. would be OK.

Desert states, like Arizona, or those states with snowy winters, where snow covers the ground for more than 40 or 50 days, or those states that are humid, but hot, like Florida, could work, but would not be preferred. Preferred locations within each state would be where the winters are mild, yearly average temperature is around 10° C., and the humidity is above 50%. Also, to protect the facility, it is important to avoid areas with frequent hurricanes, tornados, earthquake damage, or severe storms.

Embodiments of the present invention allow for the cost-effective, water-efficient, and energy-efficient capture of carbon dioxide directly from the air. Unlike prior art approaches that use amines in water solution or flows air through zeolite membranes, embodiments of this invention are designed to use small particles of an inorganic particulate material mixed with air to form a powder that absorbs carbon dioxide and water, can be pumped or conveyed, can be automatically dispensed and collected, and is not degraded in an outdoor environment by sunlight and weather. Unlike prior art, embodiments of this invention can inexpensively pump the carbon dioxide absorbing material onto and vacuum it or move it using a simple conveyor from a large concrete surface.

Embodiments also make use of a kiln that is closed to the atmosphere, in which the inorganic material is heated to release its captured carbon dioxide at as low a temperature as possible, so as to form a powder with small, highly porous particles. Embodiments also make use of frequent stirring to frequently refresh the surface of the absorbing material on the slab and increase the rate at which carbon dioxide is absorbed by almost 100 times. Finally, embodiments make use of one or more large diameter fan(s) to provide a large volume of turbulent air flow (eg. 10,000 m3/sec), but a low air velocity (eg. 0.275 m/sec) over a huge surface area, with low power consumption, rather than many smaller high-velocity fans.

The invention claimed is:

1. A system for large scale capture of carbon dioxide directly from atmospheric air, comprising:
  a slab having a flat top surface, either of rectangular or elliptical shape defined by a length and a width, or by a radius, and having an area greater than 400 sq. m
  a perimeter wall bounding the slab and projecting above the flat top surface of the slab;
  one or more rotary fans, having a combined area sufficient to provide air flow to the entire slab, each fan being configured to generate uniform, high volume, low velocity, turbulent air flow over the surface of the slab;
  a transport system operable to transfer powder comprising a mixture of air and a particulate material to and from all locations on the slab or on a mesh screen located above the slab, the transport system comprising either a vacuum/deposition system comprising one or more vacuum/deposition heads, or a conveyor system comprising one or more conveyors;
  a kiln, closed to outside air, configured to:
    heat the particulate material, after delivery to the kiln by the vacuum/deposition or conveyor system from the slab, such that carbon dioxide previously absorbed by the particulate material in the powder is released; and
    provide first and second kiln outputs, the first kiln output being the released carbon dioxide, and the second kiln output comprising either the heated particulate material, or a processed version of the heated particulate material; and
  a compressor configured to receive and compress the first kiln output, providing the compressed carbon dioxide as a compressor output;
  wherein the system is configured to be fully operational while exposed to atmospheric air and weather in an outdoor environment.

2. The system in claim 1, additionally comprising:
  one or more stirring beams; wherein each stirring beam has a beam length equal to the length, width or radius of the slab, is positioned above the slab along the length, width or radius of the slab, and is configured to move in a direction perpendicular to the beam over the slab;
  wherein each stirring beam includes a stirring mechanism operable such that, when a layer of powder comprising a mixture of air and a particulate material capable of absorbing carbon dioxide, is present on the flat top surface of the slab:
    the stirring mechanism moves some of the powder in its direction of motion, and
    the stirring mechanism operates on the powder layer, comprising top, middle and bottom regions, to lift particulate material from the bottom region, to break up any caked powder, to break up any surface skin on the top region, and to mix particulate material through the top, middle and bottom regions, such that a sublayer from a top surface of the powder layer to a depth of 60 µm has a concentration of the particulate material capable of absorbing carbon dioxide of at least 10% by weight.

3. The system in claim 1, additionally comprising:
  a mesh screen located at least 3 m above the concrete slab, wherein the one or more rotary fans are placed underneath the screen to blow air up through the screen; and
  one or more stirring beams located above the screen, operable such that when a layer of powder comprising a mixture of air and a particulate material is present on top of the screen, air from the fan(s) blows up through the layer.

4. The system of claim 1,
  wherein when the particulate material is of a first chemical composition, capable of absorbing carbon dioxide, it is an oxide or hydroxide of a metal; and
  wherein after the particulate material has absorbed carbon dioxide, it is a carbonate of the metal.

5. The system of claim 4, wherein the metal is one of calcium, sodium, aluminum, and iron.

6. The system of claim 1, wherein the kiln comprises:
  a first chamber configured to heat the particulate material delivered thereto in a carbon dioxide atmosphere, such that after releasing carbon dioxide, an intermediate output is formed, comprising the particulate material in an intermediate chemical composition; and
a second chamber configured to process, in a water vapor atmosphere, the intermediate output, such that the second kiln output comprises the particulate material restored to the first chemical composition; and
wherein the vacuum/deposition system mixes the second kiln output with air and transfers the mixture from the kiln to the slab.

7. The system of claim 1, wherein the kiln comprises:
a single chamber configured to heat the particulate material delivered thereto in a carbon dioxide atmosphere, such that after releasing carbon dioxide, the second kiln output is formed, comprising the particulate material in an intermediate state;
wherein the vacuum/deposition system mixes the second kiln output with air and transfers the mixture from the kiln to the slab, where the particulate material transferred thereto subsequently absorbs water vapor from the air and is restored to the first chemical composition.

8. The system of claim 1, wherein temperature and other process parameters of the kiln are controlled, and wherein particles may be humidified to promote agglomeration, such that the particulate material pumped or conveyed to the slab comprises highly porous particles, with an average diameter in the range of 5 µm-500 µm, each particle having an effective surface area greater than 10 times the diameter of the particle squared.

9. The system of claim 6, wherein either the first and second chambers are held at temperatures between 900° C. and 1200° C., or the first chamber is held at a temperature between 900° C. and 1200° C. and the second chamber is held at a temperature less than 500° C.

10. The system of claim 1, additionally comprising a means for collecting local rainwater in an area surrounding the slab and providing the collected water either to the kiln, or to powder transferred from the kiln to the slab.

11. The system of claim 1, wherein carbon dioxide and water vapor in any exhaust produced by the burning of natural gas in the kiln are captured by particulate material brought to the kiln from the slab, the captured water vapor subsequently being used to augment steam used in the kiln.

12. A method for large scale capture of carbon dioxide directly from atmospheric air, the method comprising: creating a receptacle of large area, the receptacle comprising a slab having a flat top surface, and a perimeter wall bounding the slab and projecting above the flat top surface of the slab; depositing, by means of pumping or conveying, a powder comprising a mixture of air and a particulate material of a first chemical composition, capable of absorbing carbon dioxide, as a layer either on the flat top surface of the slab, or on a screen positioned above the slab; providing a uniform, high volume, low velocity, turbulent air flow to expose the particulate material in the deposited layer to overlying air, such that the particulate material absorbs carbon dioxide from the air; transferring, by means of pumping or conveying, the powder from the slab to and from a kiln, closed to outside air; heating the particulate material in the kiln such that carbon dioxide previously absorbed by the particulate material in the powder is released; compressing the released carbon dioxide for transport to a storage location;
pumping or moving by one or more conveyors, from the kiln to the slab, an output that comprises either the heated particulate material mixed with air or a processed version of the heated particulate material mixed with air, the processing being carried out within the kiln; and depositing the output either on the flat top surface of the slab or on a screen positioned above the slab; wherein the method is fully operable while the receptacle and any layer of powder present on or above the top surface of the slab of the receptacle are exposed to atmospheric air and weather in an outdoor environment.

13. The method of claim 12, additionally comprising stirring the layer of powder, such that:
some of the powder is moved along the width or length or radius of the slab; and
if the layer of powder is taken as comprising top, middle and bottom regions, particulate material is lifted from the bottom region, to break up any caked powder, to break up any surface skin on the top region, and to mix particulate material through the top, middle and bottom regions, such that a sublayer from a top surface of the powder layer to a depth of 60 µm has a concentration of the particulate material capable of absorbing carbon dioxide of at least 10% by weight.

14. The method of claim 12, wherein when the particulate material is in the first chemical composition, capable of absorbing carbon dioxide, it is an oxide or hydroxide of a metal; and
wherein after the material has absorbed carbon dioxide, it is in a second chemical composition, as a carbonate of the metal.

15. The method of claim 14, wherein the metal is one of calcium, sodium, aluminum, and iron.

16. The method of claim 12, wherein the kiln comprises:
a first chamber configured to heat the transferred particulate material in a carbon dioxide atmosphere, such that after releasing carbon dioxide, an intermediate output is formed, comprising the particulate material in an intermediate chemical composition; and
a second chamber configured to process, in a water vapor atmosphere, the intermediate output, such that the processed version of the heated particulate material comprises particulate material restored to the first chemical composition;
wherein the method mixes the processed version of the heated particulate material with air and returns it from the kiln to the slab.

17. The method of claim 12, wherein the kiln comprises:
a single chamber configured to heat the transferred particulate material in a carbon dioxide atmosphere, such that after releasing carbon dioxide, the output is formed, comprising the particulate material in an intermediate chemical composition;
wherein after the output is mixed with air and pumped from the kiln to the slab, and is deposited thereupon, the particulate material absorbs water vapor from the air and is restored to the first chemical composition.

18. The method of claim 12, wherein temperature and other process parameters of the kiln are controlled during the processing, and wherein particles in the particulate matter output from the kiln are humidified to promote agglomeration, such that the particulate material in the output pumped or otherwise conveyed from the kiln to the slab comprises highly porous particles, with an average diameter in the range of 5-500 µm.

19. The method of claim 16, wherein either the first and second chambers are held at temperatures between 900° C. and 1200° C., or the first chamber is held at a temperature between 900° C. and 1200° C. and the second chamber is held at a temperature less than 500° C.

20. The method of claim 12, wherein carbon dioxide and water vapor in any exhaust produced by the burning of natural gas used in the kiln are captured by particulate matter brought to the kiln from the slab, the captured water vapor subsequently being used to augment steam used in the kiln.

* * * * *